(12) United States Patent
Kim et al.

(10) Patent No.: US 11,403,807 B2
(45) Date of Patent: Aug. 2, 2022

(54) LEARNING HYBRID (SURFACE-BASED AND VOLUME-BASED) SHAPE REPRESENTATION

(71) Applicant: Adobe Inc., San Jose, CA (US)

(72) Inventors: Vladimir Kim, Seattle, WA (US); Omid Poursaeed, New York, NY (US); Noam Aigerman, San Francisco, CA (US); Matthew Fisher, San Carlos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/799,664

(22) Filed: Feb. 24, 2020

(65) Prior Publication Data

US 2021/0264659 A1 Aug. 26, 2021

(51) Int. Cl.
  *G06T 15/20* (2011.01)
  *G06N 3/04* (2006.01)
  *G06K 9/62* (2022.01)
  *G06N 3/08* (2006.01)

(52) U.S. Cl.
  CPC .......... *G06T 15/205* (2013.01); *G06K 9/6262* (2013.01); *G06N 3/04* (2013.01); *G06N 3/08* (2013.01); *G06T 2200/24* (2013.01)

(58) Field of Classification Search
  CPC combination set(s) only.
  See application file for complete search history.

(56) References Cited

U.S. PATENT DOCUMENTS

| 2018/0240243 | A1* | 8/2018 | Kim | G06T 7/162 |
| 2021/0074052 | A1* | 3/2021 | Ha | G06T 15/005 |
| 2021/0319209 | A1* | 10/2021 | Deng | G06N 3/0454 |
| 2021/0390776 | A1* | 12/2021 | Wang | G06T 7/50 |

OTHER PUBLICATIONS

Genova et al. ("Learning Shape Template With Structured Implicit Function", Computer Vision Foundation, 2019) (Year: 2019).*
Saito et al. ("PIFu: Pixel-Aligned Implicit Function for High-Resolution Clothed Human Digitization" Computer Vision Foundation, 2019 (Year: 2019).*
Achlioptas, et al., "Learning Representations and Generative Models for 3D Point Clouds", Cornell University, Computer Science, arXiv.org>cs.arCiv:1717.02392v3, submitted on Jul. 8, 2017 (v1), last revised Jun. 12, 2018 (this version, v3), 18 pages.

(Continued)

*Primary Examiner* — Sing-Wai Wu
*Assistant Examiner* — Khoa Vu

(57) ABSTRACT

Certain embodiments involve techniques for generating a 3D representation based on a provided 2D image of an object. An image generation system receives the 2D image representation and generates a multi-dimensional vector of the input that represents the image. The image generation system samples a set of points and provides the set of points and the multi-dimensional vector to a neural network that was trained to predict a 3D surface representing the image such that the 3D surface is consistent with a 3D surface of the object calculated using an implicit function for representing the image. The neural network predicts, based on the multi-dimensional vector and the set of points, the 3D surface representing the object.

18 Claims, 8 Drawing Sheets

(56) References Cited

OTHER PUBLICATIONS

Groueix, et al., "AtlasNet: A Papier-Mache Approach to Learning 3D Surface Generation ", Cornell University, Computer Science>Computer Vision and Pattern Recognition, arXiv.org>cs/arXiv:1802.05384v3, submitted on Feb. 15, 2018 (v1), last revised Jul. 20, 2018 (this version, v3), 16 pages.

Litany, et al., "Deformable Shape Completion with Graph Convolutional Autoencoders" Cornell University, Computer Science>Computer Vision and Pattern Recognition, arXiv.org>cs>arXiv:1712.00268v4, submitted on Dec. 1, 2017 (v1), last revised Apr. 3, 2018 (this version, v4), 10 pages.

Mescheder, et al., "Occupancy Networks: Learning 3D Reconstruction in Function Space", Cornell University, Computer Science>Computer Vision and Pattern Recognition, arXiv.org>cs>arXiv:1812.03828 v2, Submitted on Dec. 10, 2018 (v1), last revised Apr. 30, 2019 (this version, v2), 11 pages.

Park, et al., "DeepSDF: Learning Continuous Signed Distance Functions for Shape Representation", Cornell University, Computer Science> Computer Vision and Pattern Recognition, arXiv>cs>arXiv:1901.0510v1, submitted on Jan. 16, 2019, 19 pages.

Tatarchenko, et al., "Octree Generating Networks: Efficient Convolutional Architectures for High-resolution 3D Outputs", Cornell University, Computer Science>Computer Vision and Pattern Recognition, arXiv.org>cs>arXiv:1703.09439V3, submitted on Mar. 28, 2017 (v1), last revised Aug. 7, 2017 (this version, v3), 15 pages.

Wang, et al., "DISN: Deep Implicit Surface Network for High-quality Single-view 3D Reconstruction", Cornell University, Computer Science>Computer Vision and Pattern Recognition, arXiv.org>cs>arXiv:1905.10711v2, Submitted on May 26, 2019 (v1), last revised Oct. 3, 2019 (this version, v2), 11 pages.

Yin, et al,, "P2P-N ET: Bidirectional Point Displacement Net for Shape Transform" Cornell University, Computer Science > Graphics, arXiv.org>cs>arXiv:1803.09263v4, Submitted on Mar. 25, 2018 (v1), last revised May 15, 2018 (this version, v4), 13 pages.

\* cited by examiner

LEARNING HYBRID (SURFACE-BASED AND VOLUME-BASED) SHAPE REPRESENTATION

TECHNICAL FIELD

This disclosure relates generally to computer-implemented methods and systems for image processing. Specifically, the present disclosure involves training and implementing a neural network for representing three-dimensional shapes using a continuous representation that is consistent with the level set of an implicit volumetric function.

BACKGROUND

Three-dimensional (3D) representation creation and rendering has gained popularity in many areas including for use in video gaming, movies, television, advertising, and the like. The expectations for the quality and speed at which the 3D representations need to be created are high. Existing techniques for creating 3D representations sacrifice speed for quality or vice versa.

BRIEF SUMMARY

Certain embodiments involve techniques for training and implementing a neural network for representing 3D shapes that has the advantages of speed and quality by virtue of creating the 3D representation as a continuous representation that is consistent with the level set of an implicit function. In one embodiment, a 3D representation generation system receives an input that represents an object (e.g., an image of the object). The system generates a multi-dimensional vector for the input. The system samples a set of points from a two-dimensional space and provides the set of points and the multi-dimensional vector for the input to a neural network. The neural network was trained to predict a three-dimensional surface representing the input such that the three-dimensional surface corresponds to a second three-dimensional surface of the object calculated using an implicit function for representing the input. The neural network predicts the three-dimensional surface representing the input based upon the multi-dimensional vector and the set of points, where the three-dimensional surface includes a three-dimensional representation of the object. Embodiments of this aspect include corresponding computer systems, apparatus, and computer programs recorded on one or more computer storage devices, each configured to perform the actions of the techniques.

In additional or alternative embodiments, the input is a two-dimensional image of the object. In some embodiments, the neural network is trained using many training inputs, where the training includes, for each of the training inputs, encoding the training input into a training multi-dimensional vector, and receiving the training multi-dimensional vector and a training set of points at the neural network. The neural network generates the training three-dimensional surface based on the training multi-dimensional vector and the training set of points. A second neural network also receives the multi-dimensional vector. The second neural network generates the implicit function representing the training input based on the multi-dimensional vector. A loss is calculated based on the training three-dimensional surface and the implicit function, and parameters of the neural network are adjusted based on the loss. Calculating the loss can include calculating the normal value of the three-dimensional surface at a random point on the three-dimensional surface and calculating the gradient of the implicit function at the random point. The loss may be based at least in part on the difference between the normal value of the surface and the gradient of the implicit function at the random point. In some embodiments, the loss can include calculating the value of the implicit function at a random point on the surface of the three-dimensional surface, where the loss is the based on the difference between the value and zero given that the level set of the implicit function representing the surface of the object is zero. In some embodiments, the three-dimensional surface is provided to a user device for viewing in a graphical user interface. Implementations of the described techniques may include hardware, a method or process, or computer software on a computer-accessible medium.

In one embodiment, a 3D representation generation system receives a set of input images for training a neural network. The 3D representation generation system encodes the input image to generate a multi-dimensional vector representing the two-dimensional image. The 3D representation generation system generates, using an implicit function neural network, an implicit function that, given a random point, provides a value indicating whether the random point is on a surface of a three-dimensional representation of the input image. The 3D representation generation system generates, using the atlas-based surface neural network, a three-dimensional surface representing the input image. The 3D representation generation system calculates a loss using the random point, the implicit function, and the three-dimensional surface and adjusts parameters of the atlas-based surface neural network based on the loss.

In additional or alternative embodiments, calculating the loss includes calculating a volumetric value of the implicit function at a random point on the surface of the three-dimensional surface and calculating the loss based at least in part on the volumetric value distance from zero. In some embodiments, calculating the loss includes calculating the normal value of the three-dimensional surface at the random point and the gradient of the implicit function at the random point. The loss can be calculated based at least in part on the difference between the normal value and the gradient. Parameters of the implicit function neural network may be adjusted based at least in part on the loss. Implementations of the described techniques may include hardware, a method or process, or computer software on a computer-accessible medium.

BRIEF DESCRIPTION OF THE DRAWINGS

Features, embodiments, and advantages of the present disclosure are better understood when the following Detailed Description is read with reference to the accompanying drawings.

DETAILED DESCRIPTION

The present disclosure involves systems and techniques for time and resource efficient generation of a 3D representation of a 2D image. Existing 3D representation generation systems generally sacrifice speed for quality or vice versa. The generation of commercial-quality 3D surfaces has been a challenge despite recent advances in deep learning. Two examples of recent neural networks are good examples of such challenges. One example is a neural network that generates an implicit function that models a shape based on an occupancy prediction. Given a point in space, the implicit function will predict whether the point is inside the shape (e.g., a negative value), outside the shape (e.g., a positive value), or on the surface of the shape (e.g., a zero value, which is the level set of the implicit function). Such a neural network generates a very accurate 3D surface, however to generate the shape a time and resource expensive non-differentiable marching cubes algorithm is required to reconstruct the 3D surface. This limits applications because of the time and resources required to reconstruct the 3D surface.

Another example is a neural network that models the shape as a deformation of a two-dimensional atlas. Random points on a 1-by-1 (1×1) two-dimensional square patch are used to generate the surface by tessellating the 1×1 squares and mapping all the vertices to three dimensions. The 3D surface can be generated relatively quickly, which is useful for differential rendering pipelines, however, the resulting 3D surface tends to have visual artifacts (similar to paper crumpling).

To address the above described issues, the neural network that models the shape as a deformation of a two-dimensional atlas is used and trained using input from the neural network that generates the implicit function. The resulting hybrid neural network generates a high quality 3D surface efficiently by virtue of using 2D deformation guided by the implicit function such that the 3D surface is consistent with the level set of the implicit function.

Figure 1:
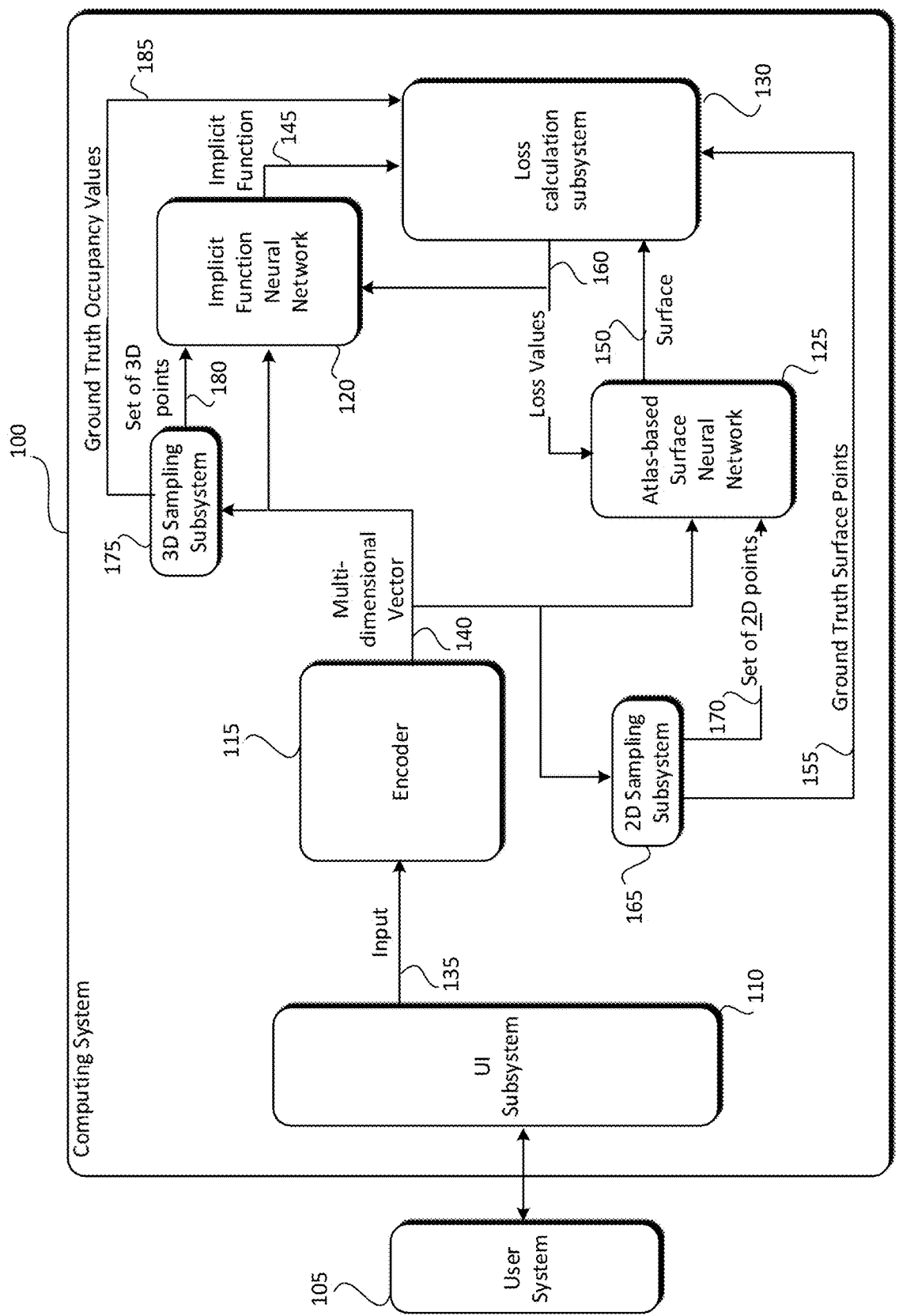
FIG. 1 depicts an example of a three-dimensional (3D) image generation system, according to certain embodiments.
Figure 8:
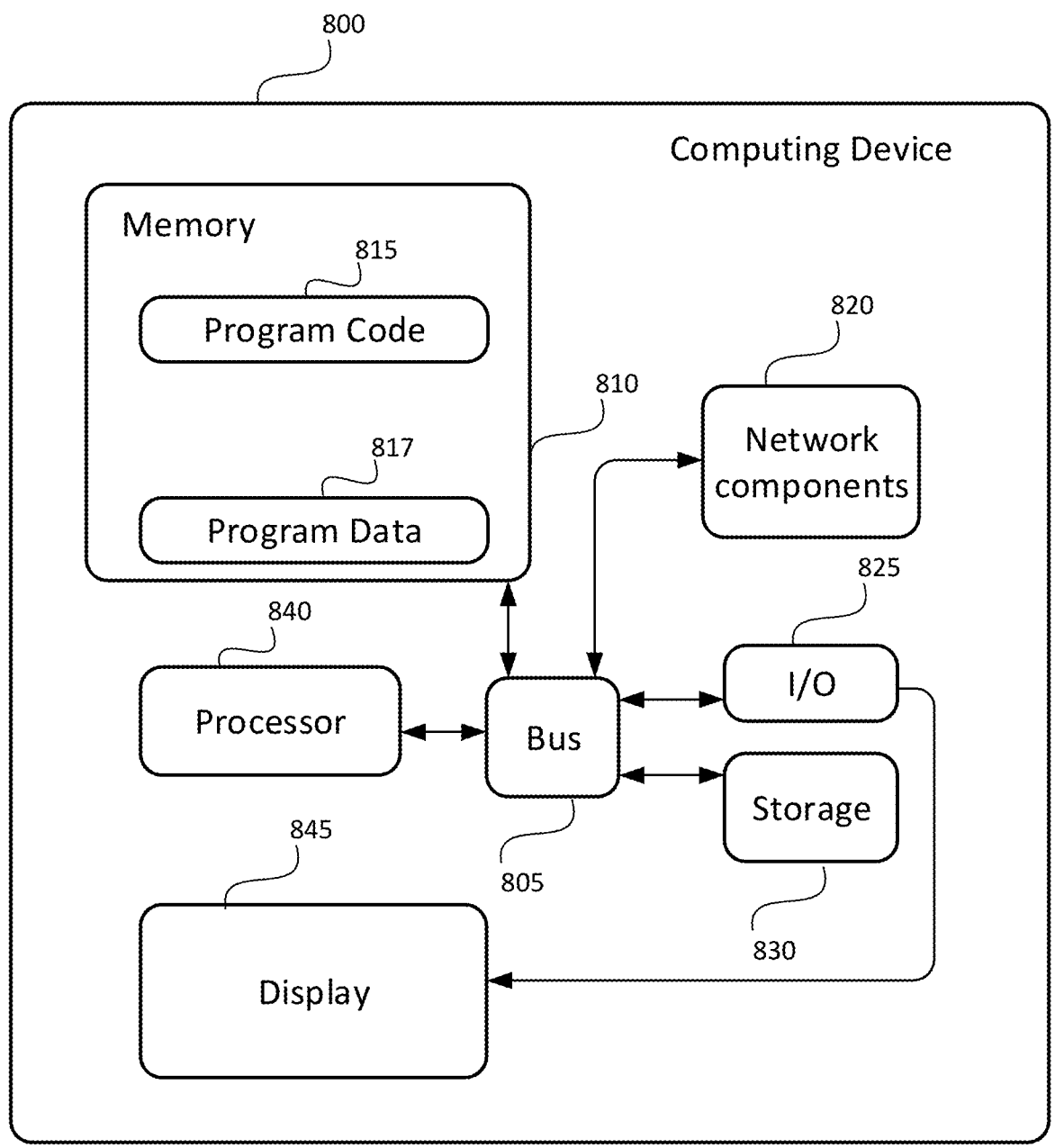
FIG. 8 depicts an example of a computing device that may implement the 3D representation generation system, according to certain embodiments.

Referring to the drawings, FIG. 1 illustrates a 3D representation generation system 100 for generating a 3D representation. The 3D representation generation system 100 includes a user interface (UI) subsystem 110, encoder 115, implicit function neural network 120, atlas-based surface neural network 125, two-dimensional (2D) sampling subsystem 165, three-dimensional (3D) sampling subsystem 175, and a loss calculation subsystem 130. FIG. 1 further includes user system 105. The 3D representation generation system 100 may include more or fewer components than depicted in FIG. 1. For example, 3D representation generation system 100 may be computing device 800 as depicted in FIG. 8 that includes components not described in FIG. 1 for ease of description of the functionality for 3D representation generation. For example, 3D representation generation system 100 may include network components 820 and any other component described with respect to FIG. 8. Further, though a single 3D representation generation system 100 is depicted in FIG. 1, 3D representation generation system 100 may be a server in a server farm or cloud computing system such that other 3D representation generation systems 100 are used to distribute the functionality described herein. Further, the described functionality may be performed using more or fewer components than described with respect to FIG. 1. For example, encoder 115 may include more components to generate the multi-dimensional vector as described in more detail below. The 3D representation generation system 100 of FIG. 1 is shown with the components for training the atlas-based surface neural network 125 and/or the implicit function neural network 120 as described further below.

3D representation generation system 100 may be separate from user system 105, or may be incorporated into a single user system 105. Stated differently, 3D representation generation system 100 may be an application on a user system 105 or accessed remotely by user system 105. User system 105 may be any suitable computing device such as, for example, computing device 800 of FIG. 8. A user can utilize user system 105 to generate 3D surface representations of objects.

3D representation generation system 100 includes UI subsystem 110, encoder 115, implicit function neural network 120, atlas-based surface neural network 125, 2D sampling subsystem 165, 3D sampling subsystem 175, and loss calculation subsystem 130 for training the atlas-based surface neural network 125 to generate 3D surface representations that are consistent with the level set from the implicit function neural network 120.

The UI subsystem 110 provides a graphical user interface to the user for interacting with the 3D representation generation system 100 for generating 3D surface representations of objects. Encoder 115 receives an input from UI subsystem 110 as shown by arrow 135. The input may be a 2D representation of an object such as, for example, a 2D image of the object. In some embodiments, the input may be a point cloud. Encoder 115 encodes the input into a multi-dimensional vector representing the input (e.g., 2D image).

The 3D sampling subsystem 175 receives the multi-dimensional vector and samples a three-dimensional space to generate a set of random points in the three-dimensional space.

Random points (x, y, z) may be sampled and the points put in the set of 3D points indicated by arrow 180.

The implicit function neural network 120 is a neural network that receives a multi-dimensional vector of a 2D image as shown by arrow 140 and the set of 3D points as shown by arrow 180. The implicit function neural network uses the input and generates an implicit function that can be used to generate a 3D surface representing the object of the 2D image. The implicit function generated by the implicit function neural network 120 can be used to predict occupancy or signed distance field values for points in a 3D volume that represents the 3D representation of the input. The implicit function neural network 120 does not produce a surface representation of the input (e.g., 2D image). Rather, given a point in space, the implicit function will predict whether the point is inside the shape (e.g., a negative value), outside the shape (e.g., a positive value), or on the surface of the shape (e.g., a zero value, which is the level set of the implicit function).

The 2D sampling subsystem 165 receives the multi-dimensional vector and samples a two-dimensional space to generate a set of random points in the two-dimensional space. The two-dimensional space may be represented by 1-by-1 (1×1) squares. Random points (u, v) may be sampled on the 1×1 squares and the points put in the set of points.

The atlas-based surface neural network 125 generates a surface representing the input (e.g., 2D image) based on the set of points provided by the 2D sampling subsystem 165 as shown by arrow 170 and the multi-dimensional vector from the encoder 115 shown by arrow 140. The atlas-based surface neural network 125 may be a multilayer perceptron network that models a 2D input into 3D space without discretization of the domain. Specifically, the atlas-based surface neural network 125 receives the multi-dimensional vector and the set of points and generates the surface by tessellating a 2D grid with the 1×1 squares and then embedding the vertices to three dimensions.

Figure 2:
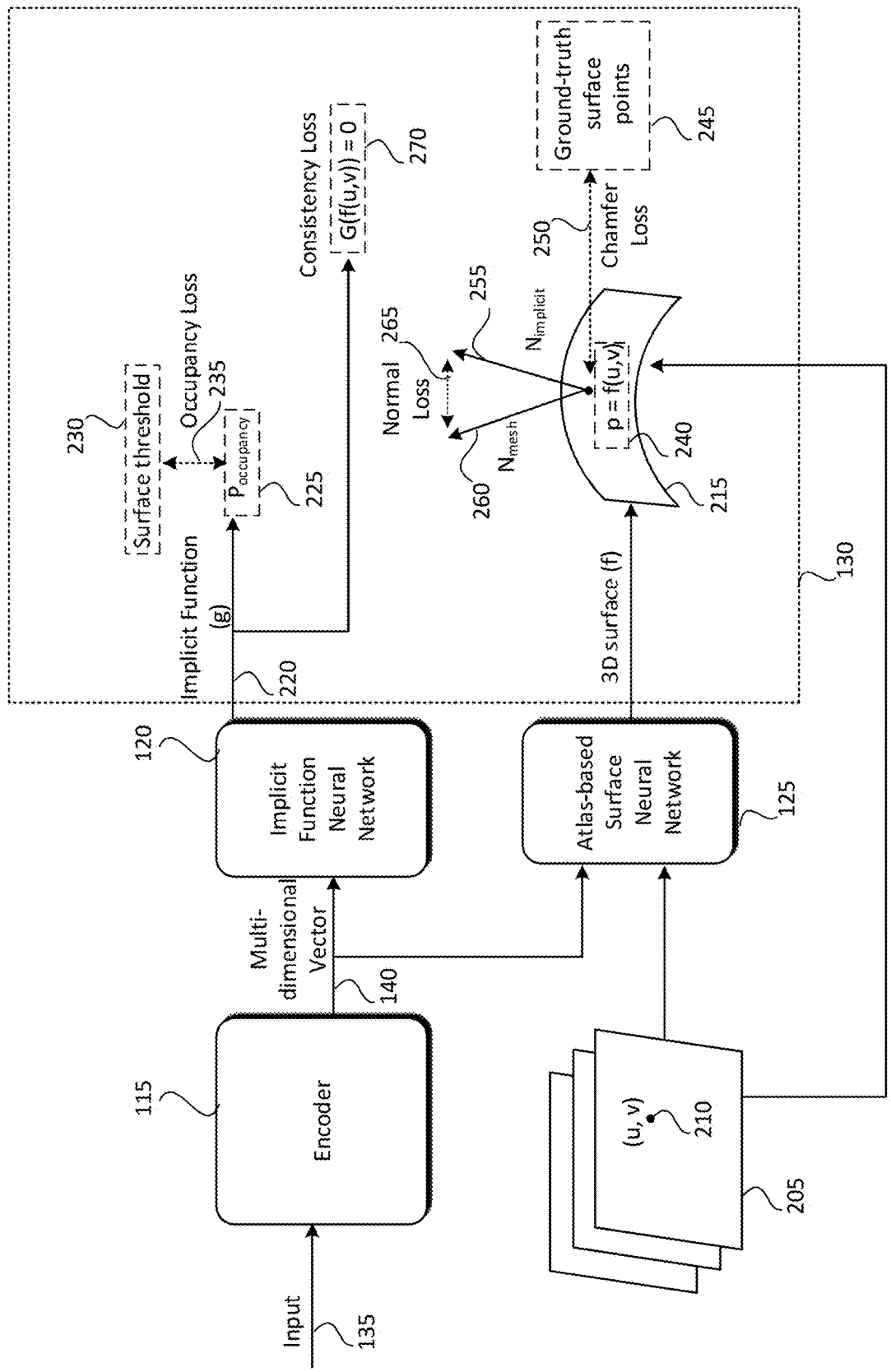
FIG. 2 depicts an example data flow of the 3D representation generation system, according to certain embodiments.

The loss calculation subsystem 130 calculates the losses, which are described in more detail in FIG. 2. The losses are used during training to tune the atlas-based surface neural network 125 such that the atlas-based surface neural network 125 generates surface representations of inputs that correspond to the level set of the implicit function neural network 120.

In use, the user of user system 105 may wish to obtain a 3D surface representation of a 2D image. The user may provide the 2D image to the UI subsystem 110 of 3D representation generation system 100. The UI subsystem 110 provides the 2D image as the input to encoder 115 as shown by arrow 135.

The encoder 115 generates a multi-dimensional vector representing the 2D image in a multi-dimensional feature space. The encoder 115 provides the multi-dimensional vector to the implicit function neural network 120, the atlas-based surface neural network 125, and the 2D sampling subsystem 165 as shown by arrow 140.

The 2D sampling subsystem 165 generates a set of 2D points that are a random sampling of points within a two-dimensional space. The 3D sampling subsystem 175 generates a set of 3D points that are a random sampling of points within a three-dimensional space. The random points are selected with uniform probability. The two-dimensional space is represented by 1×1 squares from which the 2D points are selected. The 2D sampling subsystem 165 samples points (u, v) on the 1×1 squares and provides the set of 2D points to the atlas-based surface neural network 125 as shown by arrow 170. The 2D sampling subsystem 165 also generates a set of ground truth surface points that are on the surface of the 3D representation of the input and provides them to the loss calculation subsystem 130 as shown by arrow 155. The 3D sampling subsystem 175 samples points (x, y, z) in a three-dimensional 1×1×1 space. The points are uniformly sampled. The 3D sampling subsystem 175 provides the set of 3D points to the implicit function neural network 120 as shown by arrow 180. The 3D sampling subsystem 175 also generates a set of ground truth occupancy values that are on the surface of the 3D representation of the input and provides them to the loss calculation subsystem 130 as shown by arrow 185.

The implicit function neural network 120 generates the implicit function based on the multi-dimensional vector and the set of 3D points. Specifically, the implicit function can be used to identify the points within the volume of the 3D representation of the input. Sampling points within the 3D space can provide a non-smooth representation of the object represented in the input. For example, if the input was a 2D image of a ball, the implicit function would provide a value for sampled points indicating whether the point is within the volume of the ball, outside the volume of the ball, or on the surface of the ball. The points on the surface of the object generate a value of zero from the implicit function, which is also referred to as the level set of the implicit function. The implicit function neural network 120 provides the implicit function to the loss calculation subsystem 130 as shown by arrow 145.

The atlas-based surface neural network 125 generates a 3D surface representing the object of the input using the set of 2D points (shown by arrow 170) and the multi-dimensional vector (shown by arrow 140). One may think of the atlas-based surface neural network 125 generating a 3D surface representation of the object represented by the input by plastering the 1×1 squares over the surface of the object. The atlas-based surface neural network 125 accomplishes the generation of this surface by tessellating the 1×1 squares and embedding the vertices in the 3D space based on the multi-dimensional vector. The atlas-based surface neural network 125 provides the surface to the loss calculation subsystem 130 as shown by arrow 150.

The loss calculation subsystem 130 calculates the loss, described in more detail in FIG. 2, and provides the loss values to the implicit function neural network 120 and the atlas-based surface neural network 125 as shown by arrow 160. In some embodiments, the implicit function neural network 120 is previously trained and is used to guide the training of the atlas-based surface neural network 125 without further training such that the loss values are provided only to the atlas-based surface neural network 125 and not the implicit function neural network 120. The atlas-based surface neural network 125 and optionally the implicit function neural network 120 adjust parameters to minimize the loss values to better train the atlas-based surface neural network 125 to generate a 3D surface that corresponds to the level set of the implicit function.

FIG. 2 illustrates an example data flow and the loss functions calculated from the 3D representation generation system training described in FIG. 1. The components described in FIG. 1 having the same numbers are the same components or have the same functionality as those described in FIG. 1. For example, encoder 115 is described in FIG. 1 and will not be described here again for simplicity and ease of reading.

Encoder 115 receives the input as shown by arrow 135 and generates the multi-dimensional vector representing the input in a multi-dimensional feature space. The multi-dimensional vector is provided to implicit function neural network 120 and atlas-based surface neural network 125 as shown by arrow 140.

The 1×1 squares 205 have points (u, v) 210 sampled from them and are also provided to atlas-based surface neural network 125. Atlas-based surface neural network generates the surface 215 and outputs the 3D surface 215. Implicit function neural network 120 generates the implicit function (g) and outputs the implicit function as shown by arrow 220.

Within the loss calculation subsystem 130, shown by a dotted box to indicate that the description within is functional, the various losses are calculated. There are four different losses that may be calculated including the occupancy loss 235, the chamfer loss 250, the normal loss 265, and the consistency loss 270.

The chamfer loss 250 is generated by determining the value of a ground-truth surface point 245 on the 3D surface 215. The chamfer loss 250 may be the only loss calculated if atlas-based surface neural network 125 is not guided by the implicit function neural network 120. The ground truth surface points (shown by arrow 155) should land on the surface 215, which is calculated as value p 240, and any difference between the ground truth surface points 245 and value p 240 is the chamfer loss 250. Mathematically, the chamfer loss 250 is calculated by $$\sum_{p \in \mathcal{A}} \min_{q \in S} |f(p;x) - q|^2 + \sum_{q \in S} \min_{p \in \mathcal{A}} |f(p;x) - q|^2 \quad (1)$$

Where p is a point in the three dimensional space and p is occupied if the implicit function is greater than the level set ($\tau \in (0,1)$). A is a set of points randomly sampled from the 1×1 unit squares, and S is a set of points (with the same size as A) on the target surface.

The occupancy loss 235 is the loss that may be calculated during training of the implicit function neural network 120. The occupancy loss 235 is calculated by generating a value for a point ($P_{occupancy}$) 225 using the implicit function. The difference between the value of point ($P_{occupancy}$) 225 and the surface threshold 230 is the occupancy loss 235.

The consistency loss 270 is the first loss calculated to help guide the atlas-based surface neural network 125 by the implicit function neural network 120. The consistency loss 270 is calculated using the random point (u, v) 210. The implicit function generates a value based on the given point 210. The given point 210 should be on the surface of the 3D representation. Any point on the surface of the 3D representation should result in a value of zero from the implicit function. If the point 210 generates a value different from zero, the point is not on the surface 215, indicating an error in the surface 215 which has identified the point 210 as on the surface 215. The value of the implicit function is a loss value that is zero when the point 210 results in a value of zero indicating the point 210 is on the surface 215. When the value is non-zero, the value indicates a distance from the surface that the point 210 is and can be used to train the atlas-based surface neural network 125. Mathematically, the consistency loss 270 is calculated by $$\|g(f(\mathcal{A};x)) - \tau\|$$

Where g is the implicit function, and f is the function representing the 3D surface 215.

The normal loss 265 is the second loss calculated to help guide the atlas-based surface neural network 125 by the implicit function neural network 120. The normal loss 265 is calculated by determining the normal value 260 of the 3D surface 215 at the point 210 as generated by the atlas-based surface neural network 125. The implicit function normal value 255 should be consistent with the normal value 260 of the 3D surface 215. The normal value 255 of the implicit function can be calculated by determining the gradient of the implicit function at the point 210. The difference between the normal value 260 of the 3D surface 215 at point 210 and the normal value 255 of the implicit function at point 210 is the normal loss 265. Mathematically, the normal value 260 of the 3D surface 215 is calculated from Jacobian of the transformation matrix $$f(u,v) = \begin{bmatrix} f_1(u,v) \\ f_2(u,v) \\ f_3(u,v) \end{bmatrix};$$

$$J = \begin{bmatrix} \frac{\partial f}{\partial u} & \frac{\partial f}{\partial v} \end{bmatrix} = \begin{bmatrix} \frac{\partial f_1}{\partial u} & \frac{\partial f_1}{\partial v} \\ \frac{\partial f_2}{\partial u} & \frac{\partial f_2}{\partial v} \\ \frac{\partial f_3}{\partial u} & \frac{\partial f_3}{\partial v} \end{bmatrix}$$

$$\mathcal{N}_{atlas} = \frac{\partial f}{\partial u} \times \frac{\partial f}{\partial v}$$

The normal value 255 of the implicit function is computed from the gradient of the implicit function with respect to input points p.

$$\mathcal{N}_{occ} = \nabla_p g(p;x)$$

And the normal loss 265 is calculated by $$\mathcal{L}_{normal} = \left| 1 - \frac{\mathcal{N}_{atlas}}{\|\mathcal{N}_{atlas}\|} \cdot \frac{\mathcal{N}_{occ}}{\|\mathcal{N}_{occ}\|} \right|$$

The total loss provided as the loss values 160 as depicted in FIG. 1 are a linear combination of the chamfer loss 250, consistency loss 270 and normal loss 265 by $$\mathcal{L}_{total} = \mathcal{L}_{chamfer} + \alpha \cdot \mathcal{L}_{consistency} + \beta \cdot \mathcal{L}_{normal}$$

In some embodiments, the occupancy loss 235 is also included in the linear combination and in some embodiments the total loss is provided to adjust the parameters of the implicit function neural network 120 as well as the atlas-based surface neural network 125.

Figure 3:
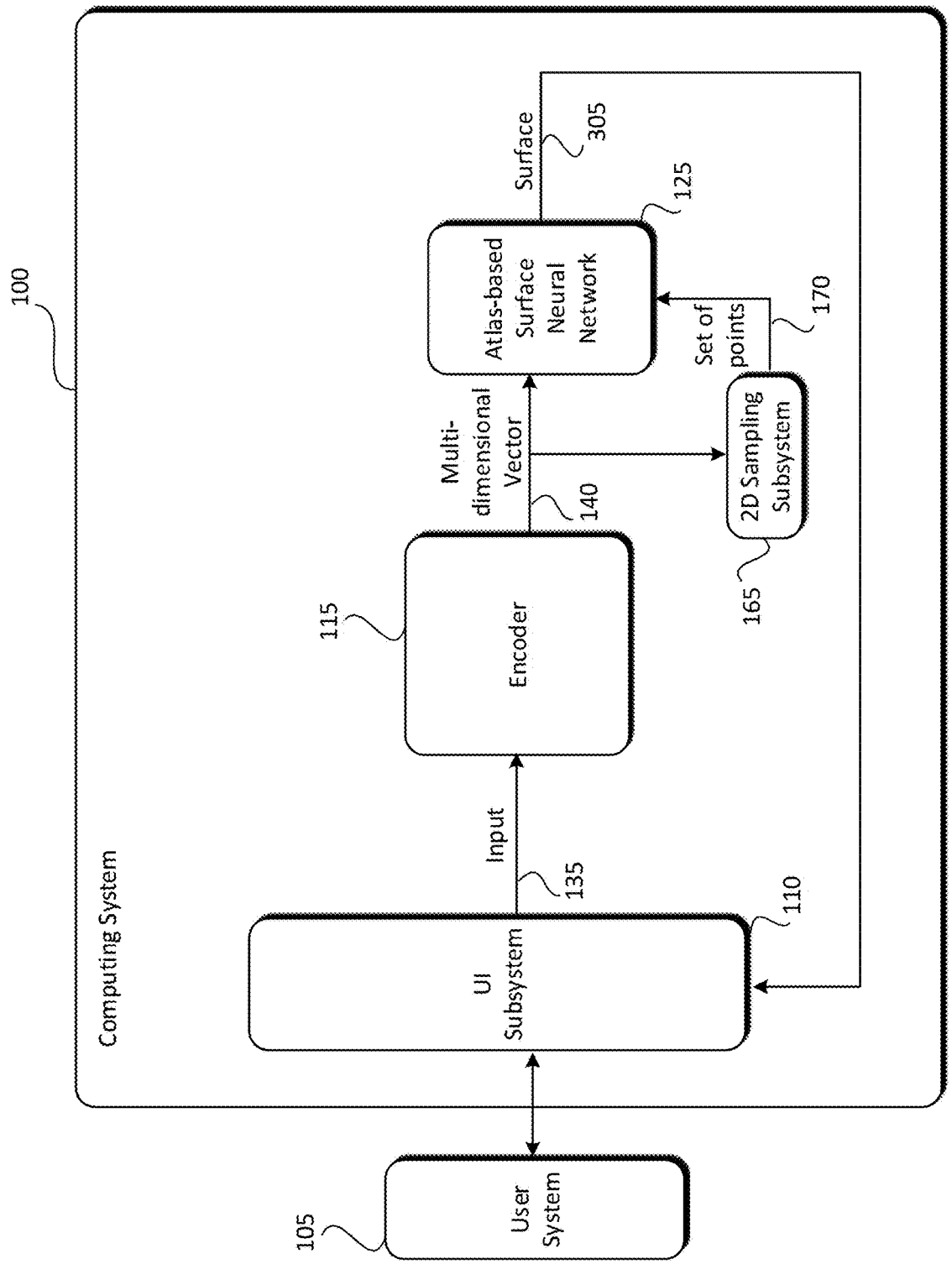
FIG. 3 depicts another example of a 3D representation generation system, according to certain embodiments.

FIG. 3 illustrates the 3D representation generation system 100 operating a runtime (test time) after training is complete. The trained atlas-based surface neural network 125 is deployed for generating 3D surface representations of the input. In use, the user of the user system 105 may provide a 2D image of an object for rendering in three dimensions. The UI subsystem 110 provides the input to the encoder 115 as shown by arrow 135. The encoder 115 generates the multi-dimensional vector of the input and provides the multi-dimensional vector to the 2D sampling subsystem 165 and the atlas-based surface neural network 125 as shown by arrow 140.

The 2D sampling subsystem 165 generates a random set of points and provides them to the mesh neural network 125 as shown by arrow 170. The random set of points are selected from the 1×1 squares.

The atlas-based surface neural network 125 generates the 3D mesh of the object represented in the 2D image provided as input. The 3D surface is consistent with the level set of the implicit function that would be generated by the implicit function neural network 120 due to the training described with respect to FIGS. 1 and 2. The 3D surface is provided to the UI subsystem 110 as shown by arrow 305. The UI subsystem 110 can render the 3D surface into a 3D representation of the object depicted in the 2D image input and provide it to the user system 105 for display to the user.

Figure 4:
FIG. 4 depicts example 3D surface representations of an object based on a two-dimensional (2D) image input, according to certain embodiments.
Figure 4:
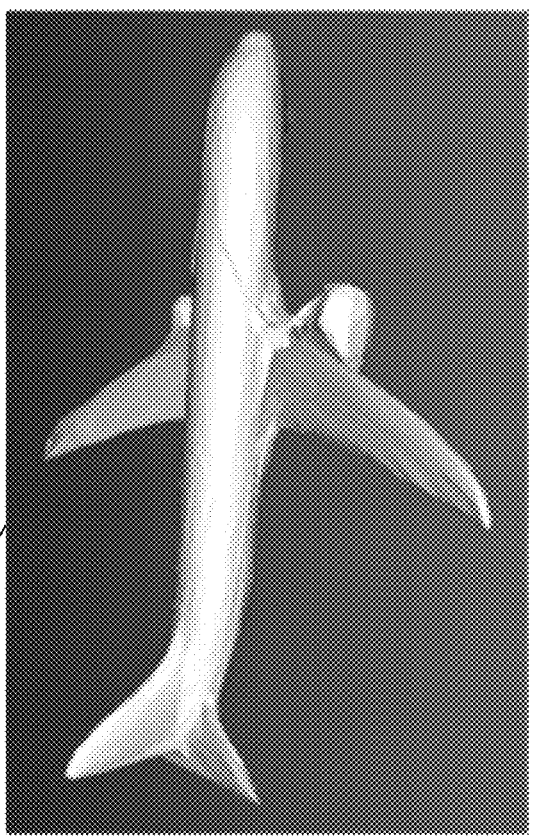

FIG. 4 illustrates example output 3D surface renderings. The 3D surface rendering 405 is generated from an atlas-based surface neural network like atlas-based surface neural network 125 that was trained using only the chamfer loss 250 and without the benefit of the guidance from the implicit function neural network 120 or losses during training such as the normal loss 265 or consistency loss 270. As shown, the surface of the 3D mesh 405 is not smooth, showing visual artifacts that resemble paper crumpling.

The 3D mesh rendering 405 is generated from atlas-based surface neural network 125 having the benefit of training that includes guidance from the implicit function neural network 120 and losses during training such as the normal loss 265 and consistency loss 270. As shown, the surface of the 3D representation 410 is much smoother than that of the 3D representation 405.

The visual benefit of the generated 3D representation 410 is substantial over the 3D representation 405, and the generation of the 3D representation requires the same time and resources for generation. The time and resources to generate a 3D representation similar to that of 3D representation 410 using the implicit function neural network 120 would be much greater than those used by atlas-based surface neural network 125. This is because to turn the implicit function into a 3D representation, one would sample the entire implicit function, requiring many more samples to obtain a representation that has comparable resolution to the one derived from the atlas grid used by atlas-based surface neural network 125. Further, the actual surface reconstruction would require running a marching cubes algorithm that is time and resource expensive. Accordingly, the superior visual results, obtained from atlas-based surface neural network 125 by virtue of the training that causes the atlas-based surface neural network 125 to generate a 3D representation that is consistent with the level set of the implicit function generated by implicit function neural network 120, are gained without the time and resource (processor, memory, etc.) expenses needed by existing systems.

Figure 5:
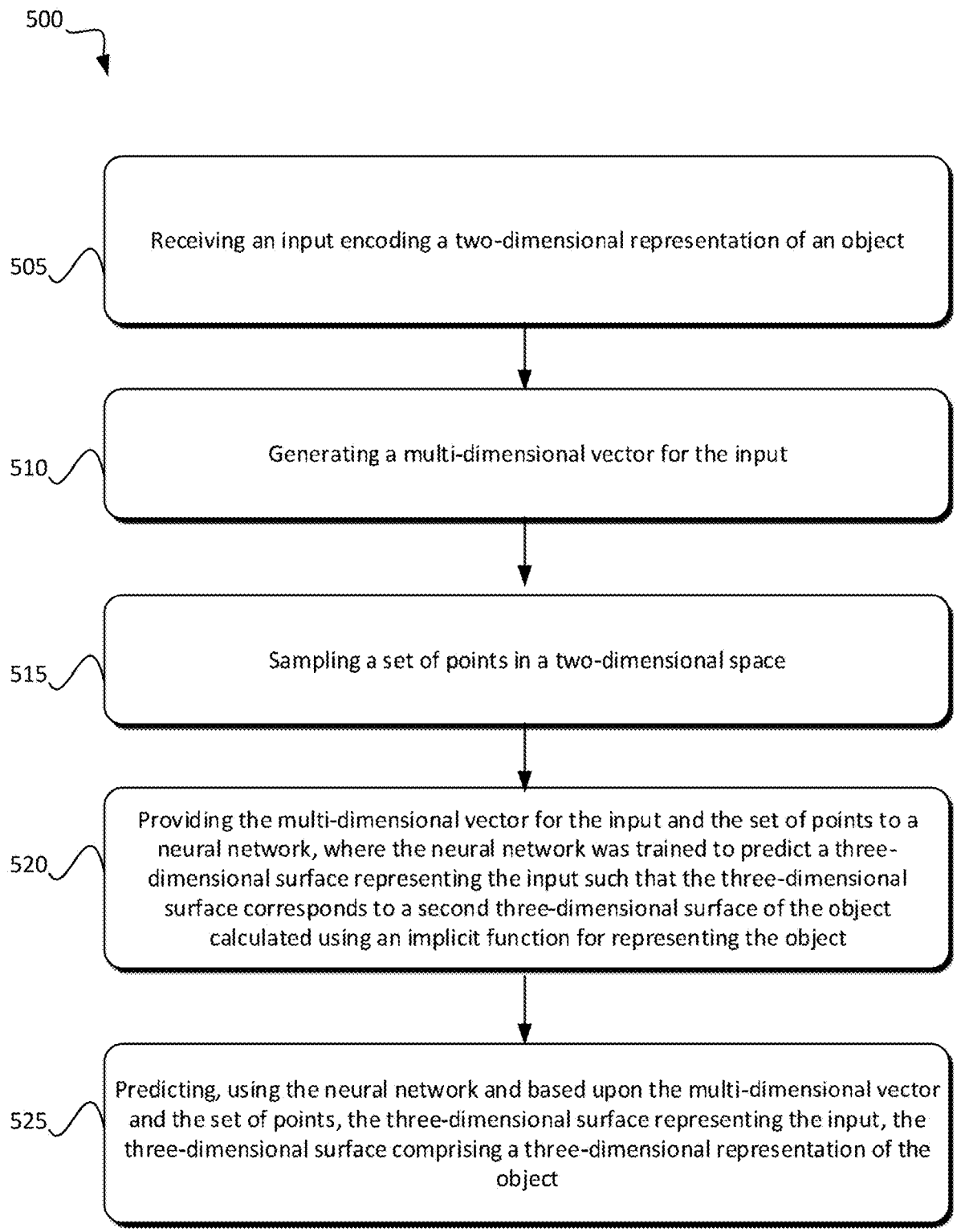
FIG. 5 depicts an example of a process for generating a 3D surface using the system of FIG. 3, according to certain embodiments.

FIG. 5 illustrates an example process 500 for generating a 3D representation with high visual quality and low resource use. The process 500 may be performed by 3D representation generation system 100 during runtime (as described with respect to FIG. 3) having been trained as described with respect to FIGS. 1 and 2. The process 500 begins at step 505 with the 3D representation generation system 100 receiving an input, where the input is a representation of an object. For example, a user may provide a 2D image depicting an object in two dimensions from which the user would like a 3D rendering of the object. As another example, a 3D sensor (such as a structured light sensor or a stereo camera) that gives per-pixel depth estimates (often referred to as 'depth maps') may provide a depth map as the input. As other examples, the input may be a point cloud representing the object, a 3D image of the object, or any other suitable representation of an object. Each of these inputs comprise estimates (e.g., depth maps, point clouds, and so forth) that are not relied upon as entirely accurate. Accordingly, one goal of the process is to refine the initial estimates of the input. The representation of the object may be encoded by an encoder, and the encoding may be provided as the input.

At step 510, the 3D representation generation system 100 may generate a multi-dimensional vector for the input. For example, encoder 115 may generate the multi-dimensional vector based on the 2D image input.

At step 515, the 3D representation generation system 100 may sample a set of points from a two-dimensional space. For example, 2D sampling subsystem 165 may sample random points on 1+1 squares such that each point represents a position in the 2D space of a 1+1 square.

At step 520, the computing system may provide the multi-dimensional vector for the input and the set of points to a neural network, where the neural network was trained to predict a three-dimensional surface representing the input such that the three-dimensional surface corresponds to a second three-dimensional surface of the object calculated using an implicit function for representing the object. For example, the neural network may be atlas-based surface neural network 125 that is trained to generate a 3D surface consistent with the three-dimensional surface of the object calculated using the implicit function generated by implicit function neural network 120.

At step 525, the neural network may predict the three-dimensional surface using the multi-dimensional vector and the set of points, where the three-dimensional surface is a three-dimensional representation of the object depicted in the input.

Figure 6:
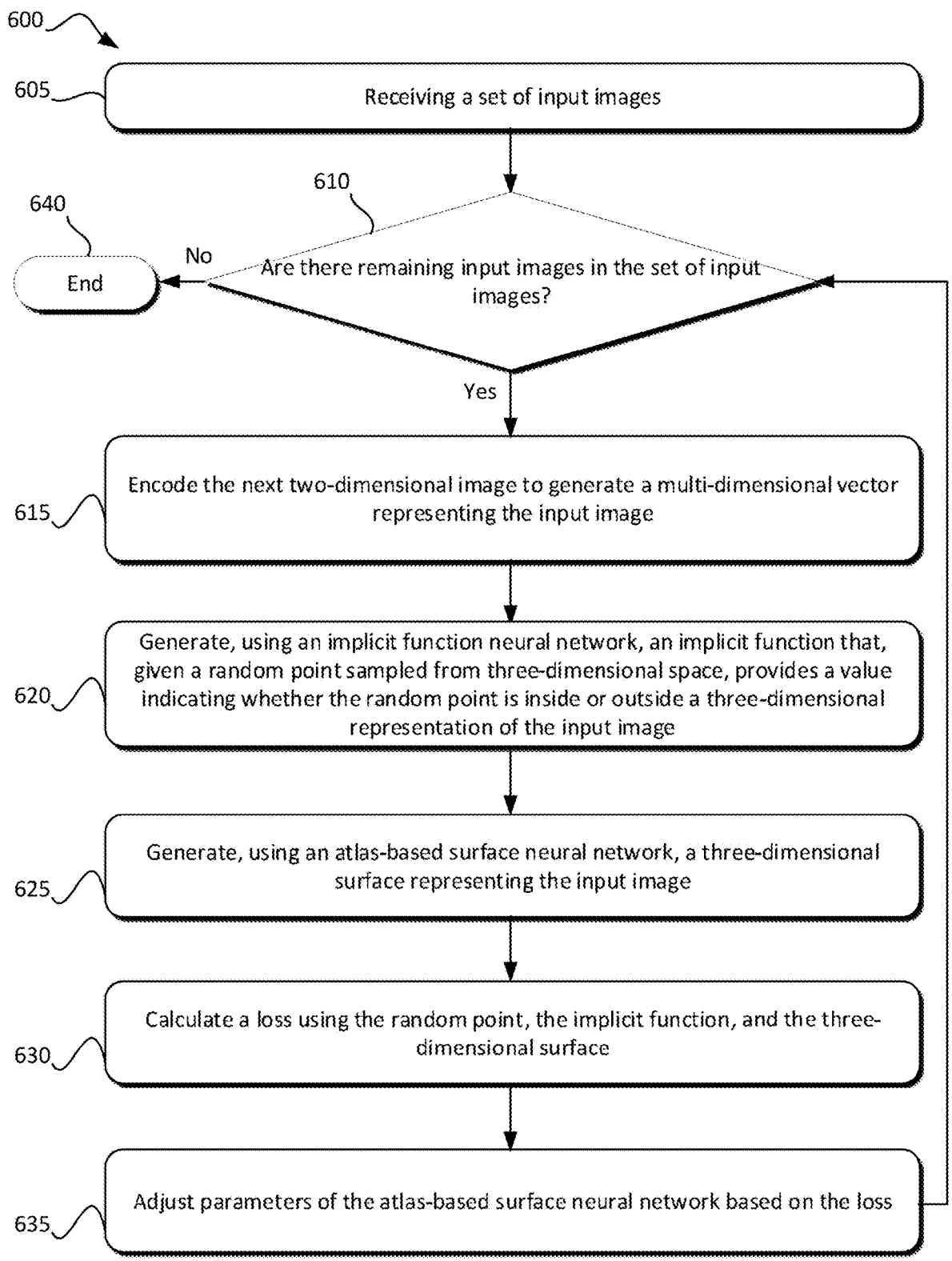
FIG. 6 depicts an example of a process for training an atlas-based surface neural network, according to certain embodiments.

FIG. 6 illustrates an example process 600 for training a neural network to generate a 3D surface with high visual quality and low resource use. The process 600 may be performed by 3D representation generation system 100 during training (as described with respect to FIGS. 1 and 2). The process 600 begins with the 3D representation generation system 100 receiving a set of input images at step 605. The input images represent training data that are used to train the neural network, such as atlas-based surface neural network 125. The input images may be two-dimensional images, point clouds, or any other suitable input.

At decision block 610, the 3D representation generation system 100 determines whether there are remaining input images in the set. Initially, there will be, so the process 600 continues to step 615 with the computing system encoding the next input image in the set to generate a multi-dimensional vector representing the input image. For example, encoder 115 may generate the multi-dimensional vector representing the input image.

At step 620, the computing system, using an implicit function neural network, may generate an implicit function that, given a random point sampled from a three-dimensional space, provides a value indicating whether the random point is inside or outside of the three-dimensional representation of the input image. For example, the random point may be sampled from 1×1×1 cubes within the three-dimensional space, and the samples may be uniformly selected. Implicit function neural network 120 may generate an implicit function based on the multi-dimensional vector and the random set of 3D points selected by a sampling subsystem such as 3D sampling subsystem 175 may be used to generate the implicit function. The implicit function provides a value indicating whether a given point is inside the volume of the 3D representation of the object in the input image input (e.g., a negative value), outside the volume of the 3D representation of the object in the input image (e.g., a positive value), or on the surface of the volume of the 3D representation of the object in the input image (e.g., a zero value). The value of zero represents that the point falls on the surface of the volume, and these zero values are the level set of the implicit function.

At step 625, the computing system, using an atlas-based surface neural network, generates a three-dimensional surface representing the input image. For example, the multi-dimensional vector representing the input and a set of randomly sampled points in a two-dimensional space may be provided to an atlas-based surface neural network such as atlas-based surface neural network 125. The atlas-based surface neural network may generate a 3D surface representing the object depicted in the input image. As described previously, the random points may be sampled from 1×1 squares representing the two-dimensional space, and the points may be sampled uniformly.

At step 630, the computing system may calculate a loss using the random point, the implicit function, and the three-dimensional surface. For example, the loss calculation subsystem 130 may generate the loss including the chamfer loss 250, the normal loss 265, and the consistency loss 270 and create a linear combination of the losses to generate the total loss. In some embodiments, the occupancy loss 235 may also be calculated and included in the total loss.

At step 635, the computing system may adjust the parameters of the atlas-based surface neural network based on the loss. For example, atlas-based surface neural network 125 may adjust its parameters based on the loss calculated at step 630. The computing system may then determine whether there are additional input images in the set of input images at decision block 610. In other words, the computing system may determine whether there is any more data in the training set. If so, the process 600 continues and repeats for each training data until no more training data exists, at which point the process 600 ends at end block 640.

Examples of Computing Environments for Implementing Certain Embodiments

Figure 7:
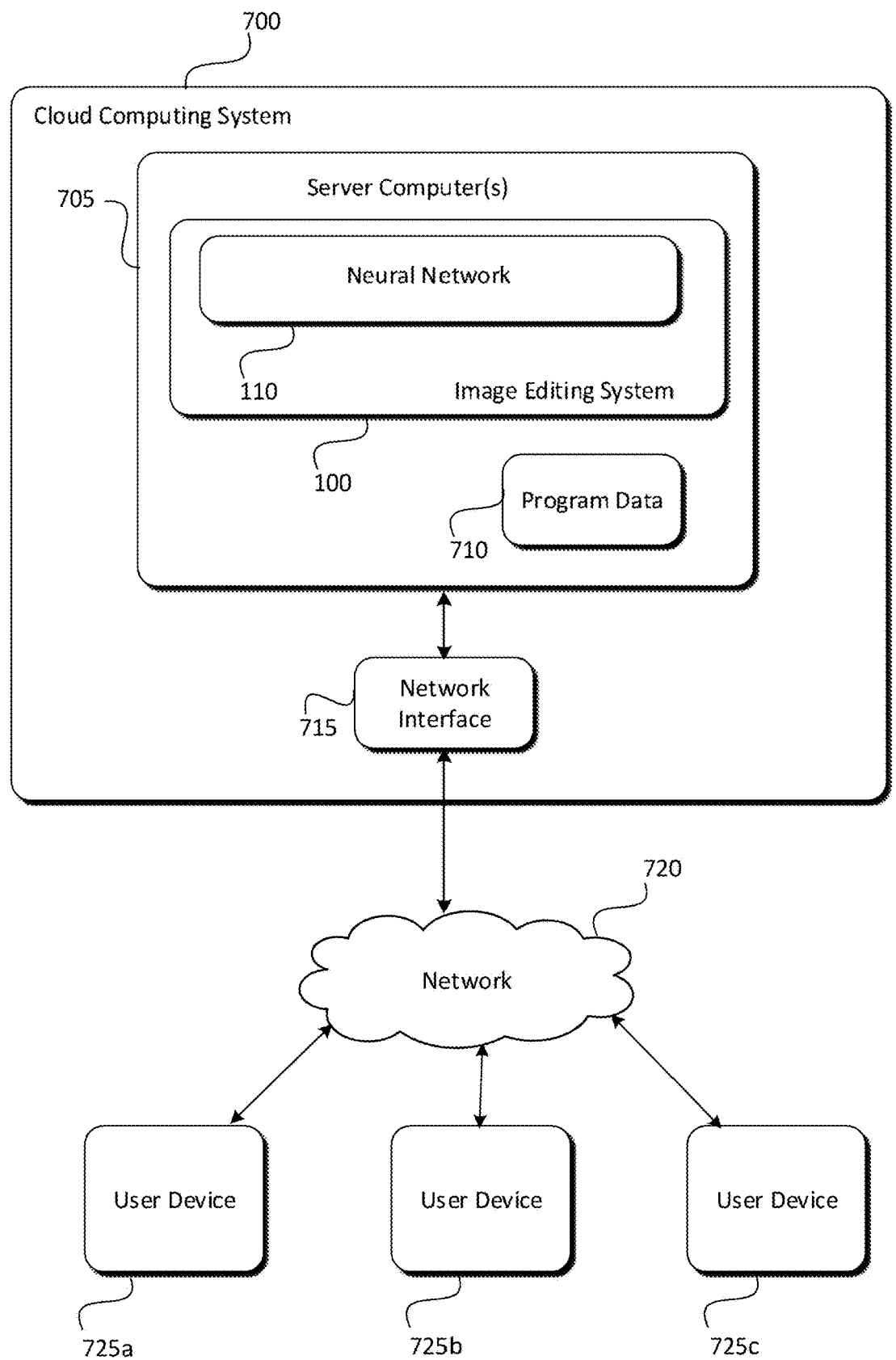
FIG. 7 depicts an example of a cloud computing system that may implement the 3D representation generation system, according to certain embodiments.

Any suitable computing system or group of computing systems can be used for performing the operations described herein. For example, FIG. 7 illustrates a cloud computing system 700 by which at least a portion of the 3D representation generation system 100 may be offered. FIG. 8 depicts an example of a computing device 800 that may be at least a portion of 3D representation generation system 100. The implementation of the computing device 800 could be used for one or more of the user systems 105. In an embodiment, a single 3D representation generation system 100 having devices similar to those depicted in FIG. 8 (e.g., a processor, a memory, etc.) combines the one or more operations and data stores depicted as separate subsystems in FIG. 1.

In some embodiments, the functionality provided by the 3D representation generation system 100 may be offered as cloud services by a cloud service provider. For example, FIG. 7 depicts an example of a cloud computing system 700 offering a 3D representation generation service that can be used by a number of user subscribers using user devices 725a, 725b, and 725c across a data network 720. User devices 725a, 725b, and 725c could be examples of a user system 105 described above. In the example, the 3D representation generation service may be offered under a Software as a Service (SaaS) model. One or more users may subscribe to the 3D representation generation service, and the cloud computing system performs the processing to provide the 3D representation generation service to subscribers. The cloud computing system may include one or more remote server computers 705.

The remote server computers 705 include any suitable non-transitory computer-readable medium for storing program code (e.g., a 3D representation generation system 100) and program data 710, or both, which is used by the cloud computing system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 705 can include volatile memory, non-volatile memory, or a combination thereof.

One or more of the servers 705 execute the program code that configures one or more processors of the server computers 705 to perform one or more of the operations that provide 3D representation generation services, including the ability to utilize the UI subsystem 110, the encoder 115, the implicit function neural network 120, the atlas-based surface neural network 125, and the loss calculation subsystem 130 to perform 3D representation generation. As depicted in the embodiment in FIG. 7, the one or more servers provide the services to perform image generation via the 3D representation generation system 100. Any other suitable systems or subsystems that perform one or more operations described herein (e.g., one or more development systems for configuring an interactive user interface) can also be implemented by the cloud computing system 700.

In certain embodiments, the cloud computing system 700 may implement the services by executing program code and/or using program data 710, which may be resident in a memory device of the server computers 705 or any suitable computer-readable medium and may be executed by the processors of the server computers 705 or any other suitable processor.

In some embodiments, the program data 710 includes one or more datasets and models described herein. Examples of these datasets include image data, multi-dimensional vectors, etc. In some embodiments, one or more of data sets, models, and functions are stored in the same memory device. In additional or alternative embodiments, one or more of the programs, data sets, models, and functions described herein are stored in different memory devices accessible via the data network 715.

The cloud computing system 700 also includes a network interface device 715 that enable communications to and from cloud computing system 700. In certain embodiments, the network interface device 715 includes any device or group of devices suitable for establishing a wired or wireless data connection to the data networks 720. Non-limiting examples of the network interface device 715 include an Ethernet network adapter, a modem, and/or the like.

The 3D representation generation system 100 is able to communicate with the user devices 725a, 725b, and 725c via the data network 720 using the network interface device 715.

FIG. 8 illustrates a block diagram of an example of a computer system 800. Computer system 800 can be any of the described computers herein including, for example, 3D representation generation system 100, user system 105, or server computer 705. The computing device 800 can be or include, for example, a laptop computer, desktop computer, tablet, server, or other electronic device.

The computing device 800 can include a processor 840 interfaced with other hardware via a bus 805. A memory 810, which can include any suitable tangible (and non-transitory) computer readable medium, such as RAM, ROM, EEPROM, or the like, can embody program components (e.g., program code 815) that configure operation of the computing device 800. Memory 810 can store the program code 815, program data 817, or both. In some examples, the computing device 800 can include input/output ("I/O") interface components 825 (e.g., for interfacing with a display 845, keyboard, mouse, and the like) and additional storage 830.

The computing device 800 executes program code 815 that configures the processor 840 to perform one or more of the operations described herein. Examples of the program code 815 include, in various embodiments, the atlas-based surface neural network 125, the implicit function neural network 120, the encoder 115, the 3D sampling subsystem 175, the loss calculation subsystem 130, the 2D sampling subsystem 165, or any other suitable systems or subsystems that perform one or more operations described herein (e.g., one or more development systems for configuring an interactive user interface). The program code 815 may be resident in the memory 810 or any suitable computer-readable medium and may be executed by the processor 840 or any other suitable processor.

The computing device 800 may generate or receive program data 817 by virtue of executing the program code 815. For example, input (shown by arrow 135) and multi-dimensional vector (shown by arrow 140) are examples of program data 817 that may be used by the computing device 800 during execution of the program code 815.

The computing device 800 can include network components 820. Network components 820 can represent one or more of any components that facilitate a network connection. In some examples, the network components 820 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 820 can be wired and can include interfaces such as Ethernet, USB, or IEEE 1394.

Although FIG. 8 depicts a single computing device 800 with a single processor 840, the system can include any number of computing devices 800 and any number of processors 840. For example, multiple computing devices 800 or multiple processors 840 can be distributed over a wired or wireless network (e.g., a Wide Area Network, Local Area Network, or the Internet). The multiple computing devices 800 or multiple processors 840 can perform any of the steps of the present disclosure individually or in coordination with one another.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A computer-implemented method, comprising:
receiving, at a computing system, an input representing an object;
generating, by the computing system, a multi-dimensional vector representing the input;
providing the multi-dimensional vector for the input to a trained first neural network, the trained first neural network generated from training a first neural network using a set of losses; and
outputting, by the trained first neural network and based upon the multi-dimensional vector, a three-dimensional surface representing the object,
wherein:
the set of losses comprises a first loss; and
training the first neural network comprises:
generating a training multi-dimensional vector for a training object,
providing the training multi-dimensional vector to the first neural network and to a second neural network, wherein the second neural network is separate from the first neural network;
generating, by the first neural network and based on the training multi-dimensional vector, a first training three-dimensional surface for the training object;
generating, by the second neural network and based on the training multi-dimensional vector, an implicit function representing a second training three-dimensional surface for the training object, the implicit function usable for identifying points within, outside, or on a surface of the second training three-dimensional surface of the training object;
calculating the first loss based on the first training three-dimensional surface for the training object and the implicit function generated by the second neural network; and
adjusting parameters associated with the first neural network to minimize the first loss.

2. The method of claim 1, wherein:
generating the first training three-dimensional space by the first neural network includes providing, to the first neural network, a set of two-dimensional points sampled from a second-dimensional space; and generating the implicit function by the second neural network includes providing, to the second neural network, a set of three-dimensional points sampled from a three-dimensional space.

3. The method of claim 1, wherein calculating the first loss comprises:
calculating a surface normal value representing a normal value of the first training three-dimensional surface at a random point on the first training three-dimensional surface;
calculating an implicit normal value representing a gradient of the implicit function at the random point; and
calculating the first loss based at least in part on a difference between the surface normal value and the implicit normal value.

4. The method of claim 1, wherein calculating the first loss comprises:
calculating a volumetric value representing a training value of the implicit function at a random point on a surface of the first training three-dimensional surface; and
calculating the first loss based at least in part on the volumetric value.

5. The method of claim 1, further comprising:
providing the three-dimensional surface to a user device for viewing in a graphical user interface.

6. The method of claim 1, wherein the input is a two-dimensional representation of an object.

7. A computer-implemented method of training a first neural network for generating a three-dimensional surface from an input image comprising:
receiving a set of training input images, wherein each training input image represents a training object; and
for each training input image in the set of training input images:
encoding the training input image to generate a training multi-dimensional vector representing the training input image;
providing the training multi-dimensional vector to a first neural network and to a second neural network, wherein the second neural network is separate from the first neural network;
generating, using the second neural network and based on the training multi-dimensional vector, an implicit function representing a second training three-dimensional surface for the training object, the implicit function usable for generating a training value indicating whether a random point is on within, outside or on a surface of the second training three-dimensional surface for the training object;
generating, using the first neural network and based on the training multi-dimensional vector, a first training three-dimensional surface for the training object;
calculating a loss using the random point, the training value of the implicit function, and the first training three-dimensional surface; and
adjusting parameters of the first neural network to minimize the loss.

8. The computer-implemented method of claim 7, wherein calculating the loss comprises:
calculating a volumetric value of the implicit function at the random point on the first training three-dimensional surface; and
calculating the loss based at least in part on the volumetric value.

9. The computer-implemented method of claim 7, wherein calculating the loss comprises:
calculating a surface normal value representing a normal value of the first training three-dimensional surface at the random point;
calculating an implicit normal value representing a gradient of the implicit function at the random point, wherein the implicit normal value corresponds to the training value; and
calculating the loss based at least in part on a difference between the surface normal value and the implicit normal value.

10. The computer-implemented method of claim 7, further comprising:
adjusting parameters of the second neural network based at least in part on the loss.

11. The computer-implemented method of claim 7, wherein:
generating the first training three-dimensional space by the first neural network includes providing, to the first neural network, a set of two-dimensional points sampled from a second-dimensional space; and
generating the implicit function by the second neural network includes providing, to the second neural network, a set of three-dimensional points sampled from a three-dimensional space.

12. The computer-implemented method of claim 7, wherein the input is a two-dimensional representation of an object.

13. A system, comprising:
one or more processors; and
a memory having stored thereon instructions that, when executed by the one or more processors, cause the one or more processors to:
receive an input representing an object;
generate a multi-dimensional vector for the input;
provide the multi-dimensional vector for the input to a trained first neural network, wherein the trained first neural network is generated from training a first neural network using a set of losses; and
output, by the trained first neural network and based upon the multi-dimensional vector, a three-dimensional surface representing the object,
wherein:
the set of losses comprises a first loss; and
training the first neural network comprises:
generating a training multi-dimensional vector for a training object;
providing the training multi-dimensional vector to the first neural network and to a second neural network, wherein the second neural network is separate from the first neural network;
generating, by the first neural network and based on the training multi-dimensional vector, a first training three-dimensional surface for the training object;
generating, by the second neural network and based on the training multi-dimensional vector, an implicit function representing a second training three-dimensional surface for the training object, the implicit function usable for identifying points within, outside, or on a surface of the second training three-dimensional surface of the training object;
calculating the first loss based on the first training three-dimensional surface for the training object and the implicit function generated by the second neural network; and adjusting parameters associated with the first neural network to minimize the first loss.

14. The system of claim 13, wherein:

generating the first training three-dimensional space by the first neural network includes providing, to the first neural network, a set of two-dimensional points sampled from a second-dimensional space; and generating the implicit function by the second neural network includes providing, to the second neural network, a set of three-dimensional points sampled from a three-dimensional space.

15. The system of claim 13, wherein the instructions for calculating the first loss comprise further instructions that, when executed by the one or more processors, cause the one or more processors to:

calculate a surface normal value representing a normal value of the first training three-dimensional surface at a random point on the first training three-dimensional surface;

calculate an implicit normal value representing a gradient of the implicit function at the random point; and calculate the first loss based at least in part on a difference between the surface normal value and the implicit normal value.

16. The system of claim 13, wherein the instructions for calculating the first loss comprise further instructions that, when executed by the one or more processors, cause the one or more processors to:

calculate a volumetric value representing a training value of the implicit function at a random point on a surface of the first training three-dimensional surface; and calculate the first loss based at least in part on the volumetric value.

17. The system of claim 13, wherein the instructions comprise further instructions that, when executed by the one or more processors, cause the one or more processors to:

provide the three-dimensional surface to a user device for viewing in a graphical user interface.

18. The system of claim 13, wherein the input is a two-dimensional representation of an object.

* * * * *